Feb. 17, 1959  R. A. EKSTROM, JR  2,873,606
FLOWMETERS PARTICULARLY FOR GASES
Filed March 27, 1956  3 Sheets-Sheet 1

Inventor:
Regner A. Ekstrom, Jr.
By Glenn S. Noble
Atty.

Feb. 17, 1959 R. A. EKSTROM, JR 2,873,606
FLOWMETERS PARTICULARLY FOR GASES
Filed March 27, 1956 3 Sheets-Sheet 2
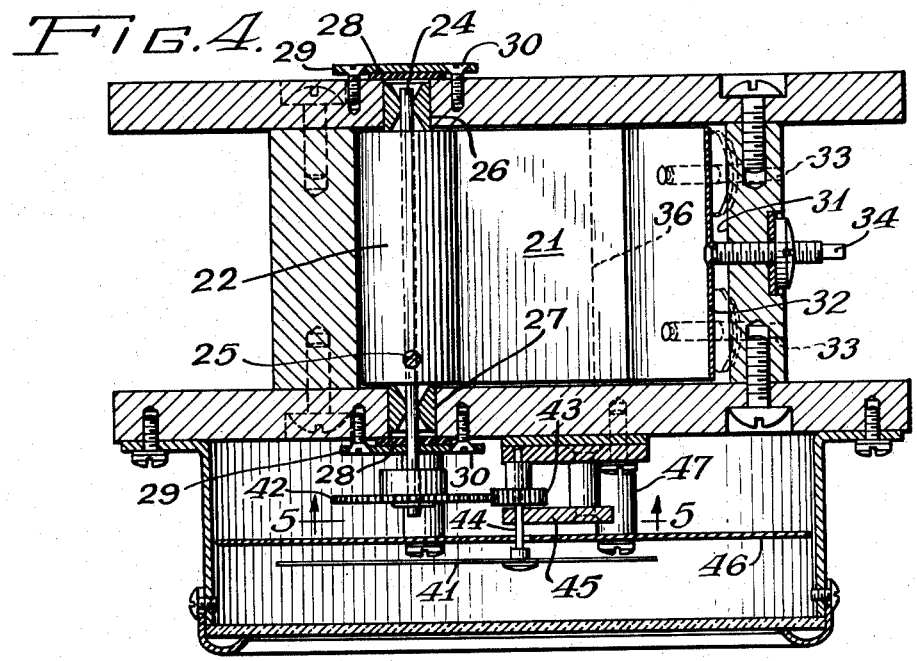
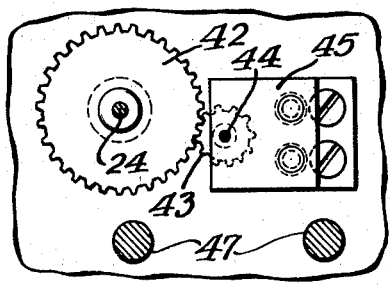
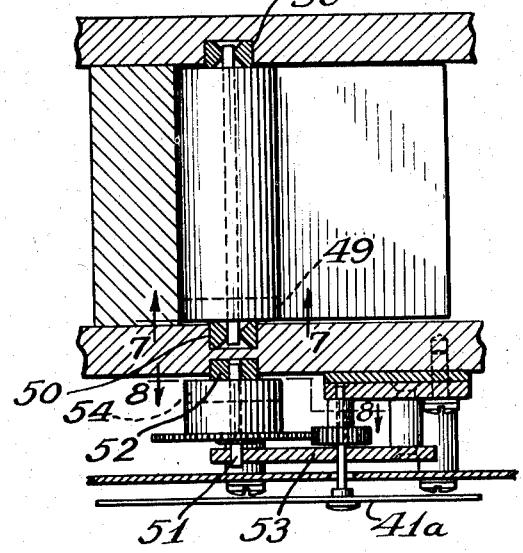
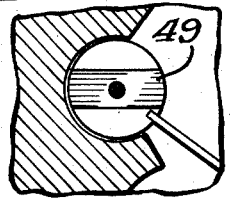
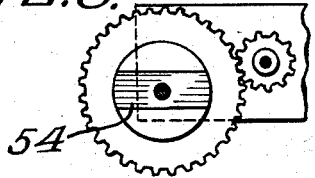
Inventor:
Regner A. Ekstrom, Jr.
By Glenn S. Noble
Atty.

Feb. 17, 1959 R. A. EKSTROM, JR 2,873,606
FLOWMETERS PARTICULARLY FOR GASES
Filed March 27, 1956 3 Sheets-Sheet 3
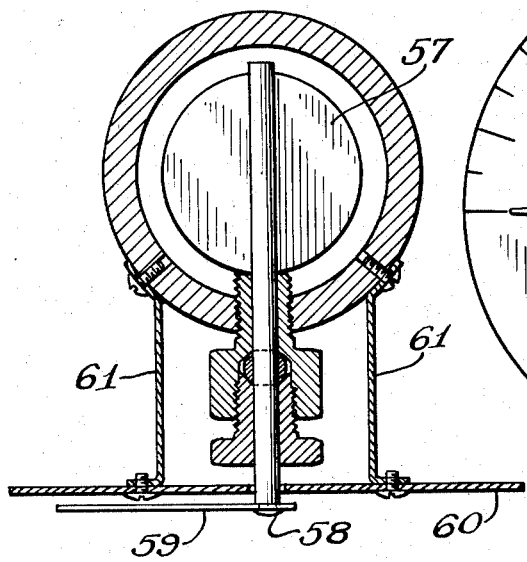
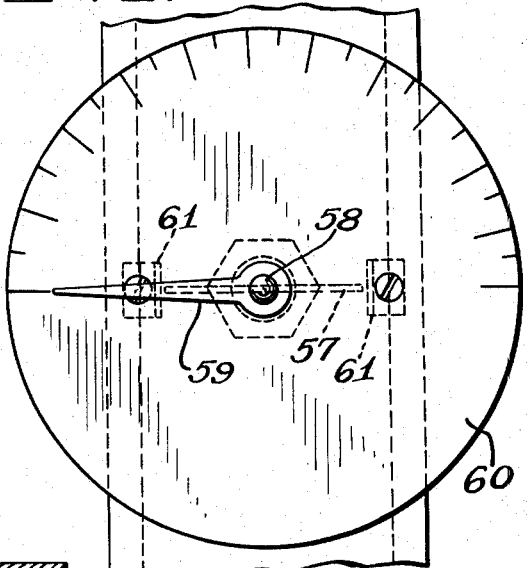
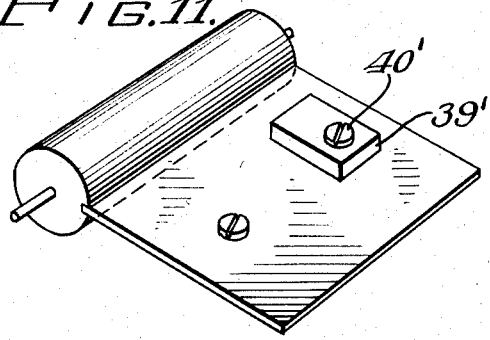
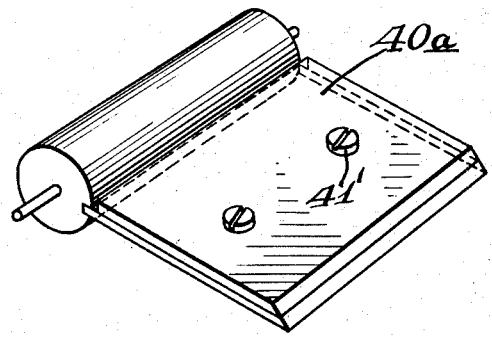
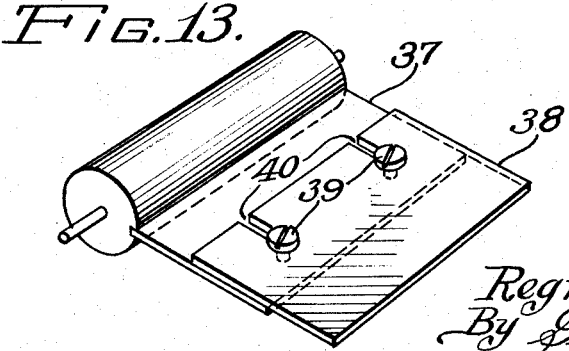
Inventor:
Regner A. Ekstrom, Jr.
By Glenn S. Noble
Atty.

United States Patent Office 2,873,606
Patented Feb. 17, 1959

2,873,606

FLOWMETERS PARTICULARLY FOR GASES

Regner A. Ekstrom, Jr., Harvey, Ill.

Application March 27, 1956, Serial No. 574,117

4 Claims. (Cl. 73—228)

The principal objects of the invention are to provide an improved flowmeter utilizing a vane attached to an axis or supported in bearings so that it is free to swing or oscillate and is moved to normal position by gravity or a restraining spring.

Other objects and advantages will appear more fully from the following description taken in connection with the accompanying drawings in which, Fig. 1 is a front view of the flowmeter shown with certain controlling units.

Fig. 4 is a sectional view taken substantially on the line 4—4 of Fig. 3.

Fig. 5 is a sectional detail taken on the line 5—5 of Fig. 4.

Fig. 6 is a sectional view showing certain modified constructions.

Fig. 7 is a sectional view taken on the line 7—7 of Fig. 6; and

Fig. 8 is a sectional detail taken on the line 8—8 of Fig. 6.

Fig. 9 is an enlarged sectional view taken on the line 9—9 of Fig. 1.

Fig. 10 is an enlarged view showing the calibrated dial.

Fig. 11 is a perspective view showing a modified form of vane arrangement.

Fig. 12 is a similar view showing a still further modification; and

Fig. 13 is a perspective view showing another form of vane.

Figure 3:
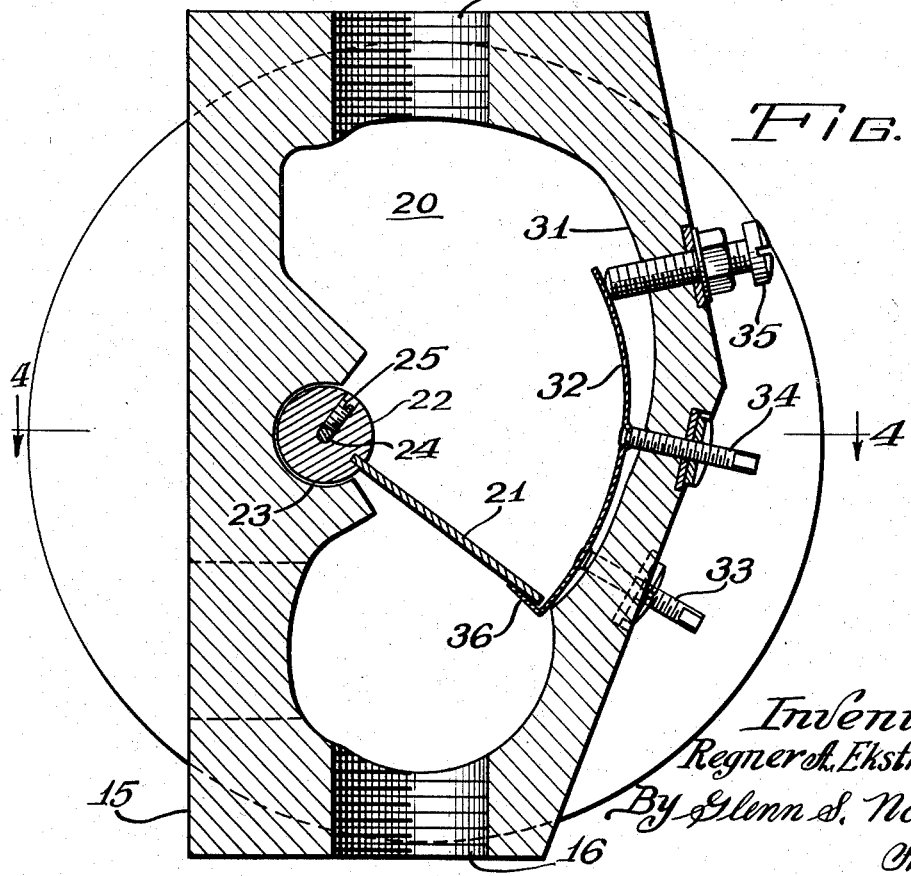
Fig. 3 is a sectional view on a further enlarged scale substantially on the line 3—3 of Fig. 2.

In the particular form of the invention as shown in these drawings, 15 is a housing or casing having an inlet 16 for the inlet pipe 17 and an outlet 18 for the outlet pipe 19. The housing has a peculiarly shaped cavity 20 as best shown in Fig. 3. The vane 21 is carried by the roller shaped bearing member 22 which is mounted in a transverse groove 23 in one side of the housing. The bearing member 22 is carried by a shaft or rod 24 being held in position thereon by means of a set screw 25. The shaft 24 is carried in bearings 26 and 27 mounted in the sides of the housing as best shown in Fig. 4. These bearings have conical shaped openings leaving small areas of contact between the bearing and the shaft in order to decrease the friction. The holes for the bearings extend through the side walls and are sealed by means of discs 28 of resilient material such as rubber or artificial rubber. These pads are engaged by plates 29 which are held in position and adjusted by means of screws 30. The diameter of the bearing member 22 is larger than that of the holes for the bearings through the side walls so that the ends of the bearing member extend over and substantially close the holes to provide additional sealing means therefor. The arrangement is such that by careful adjustment with the screws, the peripheries of the holes through the resilient pads may be adjusted so that they provide closures against any gas leakage from the housing. It will also be noted that the pad which engages with the extended end of the shaft will make a satisfactory seal without causing undue friction on the shaft.

The vane 21 extends substantially across opening 20 with the ends thereof positioned closely against the side walls of the housing. The outer end of the vane swings along the arcuate shaped wall 31 which is opposed to the pivoted end of the vane. The movement of the vane responsive to the flow of gas is controlled by varying the distance from the free end of the vane to the inside curvature 31 of the housing by interposing a flexible plate or baffle 32 formed of metal or other suitable material. The plate is mounted on adjusting screws 33 adjacent to the lower edge thereof at opposite sides of the plate and a similar adjusting screw 34 at the center and above the first named screws. The upper edge of the plate is adjusted by means of an adjusting screw 35 which extends through a threaded hole in the housing and abuts the upper portion of the vane as shown in Fig. 3.

The plate or baffle 32 has a flange or lip 36 extending across the lower end thereof against which the outer end of the vane rests when in depressed or in lowered position or when the indicating pointer is at zero on the calibrated scale. The upper portion of the baffle curves away from the arm formed by the free edge of the vane in its upward movement, thus gradually increasing the space between the vane and the baffle in accordance with the flow through the meter. The supporting and adjusting screws for the baffle provide means for increasing or decreasing the space as desired.

It will be understood that in ordinary use, the meter will stand in a vertical position so that the vane will be held in depressed position by gravity. In order to vary the capacity of the flowmeter by increasing or decreasing the area which the gases pass, I provide the vane 37 as shown in Fig. 13 with an extension 38 which is secured thereto by screws 39 which pass through slots 40 in the extension whereby the extension may be adjusted radially with respect to the vane in order to increase or decrease the passageway for the gases.

I also provide means for varying the weight of the vane to vary the capacity of the flowmeter by increasing or decreasing the back pressure on the gas due to the added weight and to compensate for the various densities of the gases. This additional weight may be in the nature of auxiliary weights 39' which may be attached to the vane in different positions as by means of screws 40' as shown in Fig. 11. Weights of different sizes may be utilized or more than one weight if desired.

Fig. 12 shows a somewhat similar manner of increasing the weight of the vane by the addition of a cover plate 40ᵃ secured thereto by screws 41'. Any of these various expedients may be utilized in adjusting or calibrating the meter for different gases or conditions.

In order to indicate the flow, the vane is connected through means of the shaft 24 with a gear train for actuating the hand or pointer 41. More specifically, a gear 42 is mounted on the shaft and engages with a pinion 43 on a stub shaft 44 which carries the hand 41 as shown in Fig. 4. The stub shaft is carried in suitable bearings 45 secured to the frame as shown. The dial 46 is mounted on posts 47 and is concentric with the shaft 44. The dial is calibrated with calibrations 48 by calibrating the measured quantities of gas passing through the meter.

In the modification shown in Fig. 6, a cylindrical magnet 49 is mounted on the shaft carrying the vane and the bearings 50 are mounted in recesses or blind holes in the walls of the casing so that there are no outlets around the shaft. A stub shaft 51 is mounted in alignment with the shaft carrying the vane and has a bearing 52 adjacent to the shaft bearing and is further supported in a bracket 53 secured on the frame as shown in Fig. 6. The stub shaft 51 has a magnet 54 opposed to the magnet 49 and adapted to coact therewith. The stub shaft 51 actuates the pointer or hand 41a through gear train as shown. The coacting magnets actuate the hand or pointer due to the movement of the vane as will be readily understood, the vane being locked magnetically to the gear and pointer exteriorly of the housing.

Figure 1:
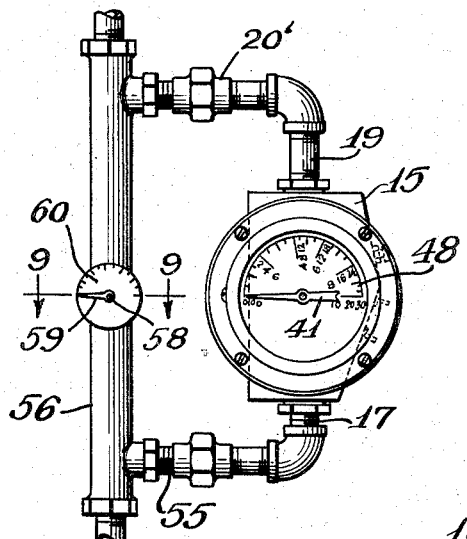
Figure 2:
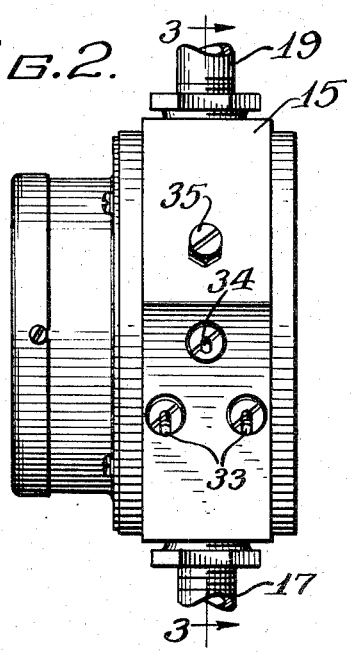
Fig. 2 is a side view on an enlarged scale.

In some cases as where the amount of gas to be measured exceeds the normal capacity of the flowmeter, the meter is connected in shunt with a riser or a main line usually of substantially larger capacity than the shunt pipes. As shown in Fig. 1, a pipe 17 is connected by fittings 55 with a main line or riser 56 and the pipe 19 is connected at some distance above the same by means of fittings 20' leading to the riser 56. A butterfly valve 57 is positioned in the riser between the two connections as shown in Fig. 1. This valve has an outward extending shaft 58 with the hand or pointer 59 which moves around the dial 60 to indicate the position of the valve and the amount of flow to be allowed therethrough. The dial 60 is secured to the pipe by brackets 61 as shown in Figs. 9 and 10. By means of this arrangement, the amount of gas to be by-passed may be regulated and brought within the capacity of the meter and the butterfly valve and meter may be calibrated as desired for the quantity of gas to be passed through the pipes.

From this description, it will be seen that I provide metering apparatus which may be utilized for forced draft control on boiler furnaces; as an air weight control for cupolas; as means for furnishing constant air supply to gas and oil burners working off from a common manifold on automatic temperature control furnaces; to provide constant air supply to aeration tanks; to provide constant air supply for pneumatic conveyors and for similar use for which the apparatus is readily adaptable.

Having thus described my invention, what I claim is:

1. A flowmeter consisting of a casing having an upright inner cavity, with an inlet at the bottom and an outlet at the top, an imperforate vane pivotally mounted at one side of the cavity for vertical oscillation, a baffle formed of flexible material secured to the wall of the cavity and coacting with the vane for regulating the passageway through the casing, said baffle having a flange extending inwardly along the lower edge for limiting the downward movement of the vane, means for adjusting the baffle toward and away from the vane for regulating the space between the baffle and the vane, and means for indicating the movement of the vane.

2. In a flowmeter, the combination of a housing to be mounted in a vertical position and having walls defining a measuring chamber, one of said walls being of arcuate shape, a lateral bearing groove in the opposite wall, a cylindrical bearing member mounted for rotation in the groove, an imperforate vane secured to the bearing member and extending across substantially the entire area of the chamber with its free end adjacent to the arcuate wall, the space between the end of the vane and the arcuate wall gradually increasing as the vane moves upwardly, means forming an inwardly extending flange at the lower edge of said arcuate wall to engage the outer edge of the vane in limiting its downward movement said chamber having an inlet below the vane and an outlet above the vane, a pivot rod extending through the bearing member, bearings in the walls of the casing for the pivot rod, and indicating means on the exterior of the casing actuated by said rod to indicate the position of the vane as fluid passes from the inlet through the chamber to the outlet.

3. A flowmeter comprising a housing having a substantially vertical passageway with an inlet at the bottom and an outlet at the top, a shaft pivotally mounted on a horizontal axis at one side of the passageway, the housing having opposite openings with bearings for the shaft therein, the shaft extending into one bearing and through the opposite one to the outside of the housing, resilient disk sealing means covering the openings at the outside of the housing and through one of which one end of the shaft projects closely to provide a gas sealing low friction connection, an imperforate vane secured to the shaft and extending across substantially the entire area of the passageway between the inlet and outlet, a curved plate extending upwardly and adjustable in the passageway at the side opposite the end of the vane curving progressively away from the outer edge of the vane and providing a gradually increasing space between the plate and the end of the vane end as the vane end moves upwardly in the passageway and having a flange extending inwardly along its lower edge for limiting the downward movement of the vane and sealing it in lowered position, and indicating means on the exterior of the housing actuated by the shaft to indicate the position of the vane as fluid passes from the inlet to the outlet.

4. In a flowmeter according to claim 3, the vane being secured to the shaft by a bearing member larger in diameter than the shaft and from which the vane projects radially, the housing having a circular recess embracing more than half a circle surrounding the shaft and closely but freely seating the bearing member therein for rotation with the vane, the bearing member extending across the passageway and the ends making a close but rotatable fit therewith and the ends being larger than said bearing openings in the housing and extending over the openings to provide additional sealing means therefor.

References Cited in the file of this patent

UNITED STATES PATENTS

| | | |
|---|---|---|
| 881,586 | Howe-Gould | Mar. 10, 1908 |
| 1,681,762 | Connet | Aug. 21, 1928 |
| 1,712,761 | Furnivall et al. | May 14, 1929 |
| 2,029,633 | Muhleisen | Feb. 4, 1936 |
| 2,047,854 | Cylmer | July 14, 1936 |
| 2,355,694 | Ardelt | Aug. 15, 1944 |
| 2,359,592 | Stokoe | Oct. 3, 1944 |
| 2,725,550 | Prior | Nov. 29, 1955 |

FOREIGN PATENTS

| | | |
|---|---|---|
| 570,191 | Great Britain | June 26, 1945 |
| 808,289 | Germany | July 12, 1951 |